US00RE36910E

United States Patent [19]

Nakata

[11] E Patent Number: Re. 36,910

[45] Reissued Date of Patent: Oct. 17, 2000

[54] ELECTRONIC MUSICAL INSTRUMENT CREATING TIMBRE BY OPTIMUM SYNTHESIS MODE

[75] Inventor: Takuya Nakata, Hamamatsu, Japan

[73] Assignee: Yamaha Corporation, Hamamatsu, Japan

[21] Appl. No.: 09/150,542

[22] Filed: Sep. 9, 1998

Related U.S. Patent Documents

Reissue of:

[64] Patent No.: 5,554,814
Issued: Sep. 10, 1996
Appl. No.: 08/549,272
Filed: Oct. 27, 1995

[30] Foreign Application Priority Data

Oct. 31, 1994 [JP] Japan ..... 6-288571

[51] Int. Cl.[7] ..... G10H 7/00; G10H 1/18

[52] U.S. Cl. ..... 84/659; 84/615; 84/618; 84/622; 84/653; 84/656

[58] Field of Search ..... 84/615, 618, 622–625, 84/653, 656, 659–661

[56] References Cited

U.S. PATENT DOCUMENTS

| | | | |
|---|---|---|---|
| 5,044,251 | 9/1991 | Matsuda et al. | 84/615 |
| 5,119,710 | 6/1992 | Tsurumi et al. | 84/615 |
| 5,192,824 | 3/1993 | Shibukawa | 84/615 |
| 5,448,009 | 9/1995 | Kudo | 84/602 |

FOREIGN PATENT DOCUMENTS

| | | |
|---|---|---|
| 3-58096 | 3/1991 | Japan . |
| 3-65999 | 3/1991 | Japan . |
| 3-78799 | 4/1991 | Japan . |
| 4-6598 | 1/1992 | Japan . |
| 4-7519 | 2/1992 | Japan . |

*Primary Examiner*—Robert E. Nappi
*Assistant Examiner*—Marlon Fletcher
*Attorney, Agent, or Firm*—Morrison & Foerster

[57] ABSTRACT

An electronic musical instrument has a composite sound source for generating a musical tone, and includes a first synthesizing circuit for creating a variety of timbres of the musical tone having a superior quality and a second synthesizing circuit for creating another variety of timbres of the musical tone having an inferior quality. The instrument admits designation information effective to designate one of the first and second synthesizing circuits to be activated and effective to designate a timbre to be created by the designated one of the first and second synthesizing circuits. A detector operates when the second synthesizing circuit is designated for providing a detection signal if the designated timbre can be also created by the first synthesizing circuit. A controller responds to the detection signal for altering the admitted designation information so that the first synthesizing circuit is activated in place of the second synthesizing circuit so as to create the designated timbre by the superior quality.

32 Claims, 4 Drawing Sheets

FIG.2

| | Timbre available by expansion sound source | | Timbre not available by expansion sound source | |
|---|---|---|---|---|
| | Replacement allowed | Replacement inhibited | Timbre available by standard sound source | Timbre not available by standard sound source |
| Expansion sound source designated | Normal generation by Expansion sound source | Normal generation by Expansion sound source | Substitute generation by standard sound source | Ignore designation information |
| Standard sound source designated | Substitute generation by Expansion sound source | Normal generation by standard sound source | Normal generation by standard sound source | Normal generation by standard sound source |

ELECTRONIC MUSICAL INSTRUMENT CREATING TIMBRE BY OPTIMUM SYNTHESIS MODE

Matter enclosed in heavy brackets [ ] appears in the original patent but forms no part of this reissue specification; matter printed in italics indicates the additions made by reissue.

BACKGROUND OF THE INVENTION

The present invention relates to an electronic musical instrument having a plurality of musical sound synthesizing circuits which have different tone generation mechanisms.

Conventionally, the electronic musical instrument has musical sound synthesizing means which produces a musical sound in a timbre specified by timbre designation information. The timbre designation information is externally supplied to the electronic musical instrument to create a timbre for a produced musical sound.

One type of the electronic musical instrument has a wide variety of available timbres. Another type of the electronic musical instrument has only a small number of available timbres. When an electronic musical instrument having only a small number of timbres is supplied with timbre designation information which specifies a timbre not available by the instrument, it cannot produce a sound by the specified timbre. However, it is unnatural for the electronic musical instrument not to produce a sound while receiving a tone generation command to request sound production. Thus, as disclosed in Japanese Patent Application Laid-open Publication No. 4-7519, the specified timbre is replaced by a substitute timbre which can be created by itself, whereby a sound is successfully produced.

Regarding tone generation mechanisms adopted in the musical sound synthesizing means of the electronic musical instrument, in addition to a conventional FM synthesis mode and a waveform reading mode, a physical model mode is recently developed, which is designed to simulate physical behavior of a natural musical instrument to synthesize a musical sound. As for the electronic musical instrument of the physical model system, a wind instrument type is disclosed in Japanese Patent Application Laid-open No. 3-65999, and a piano type is disclosed in Japanese Patent Application Laid-open No. 3-58096. The physical model system is superior to the conventional sound producing systems in an extent of variations of timbres, and is capable of synthesizing high-quality musical sounds.

In MIDI (Musical Instruments Digital Interface) standard which prescribes transaction scheme of signals between electronic musical instruments, a timbre coding system is recently introduced, which aims at reproducing substantially the same quality of a musical tone in diverse models of any maker by standardizing timbre designation information. The common coding system is based on a timbre table registered in a waveform memory type of the sound source which can prepare many waveforms relatively easily to cover a practically sufficient variety of timbre species.

However, when a musical sound of a natural musical instrument is to be simulated, it is necessary for the sound source of the aforesaid physical model system to use a specific program designed according to a mode of generating a musical sound associated to strings to be twanged, strings to be rubbed, reeds and the like, in contrast to the waveform memory type of the sound source which employs sampling of natural sounds. Thus, the sound source of the physical model system is not good for preparing a wide variety of timbres. Accordingly, a sound source of the waveform memory type and another sound source of the physical model type are integrated into a single electronic musical instrument. Sound production by the physical model type sound source is effected for limited timbres, and sound production by the waveform memory type sound source is effected for the rest, whereby high-quality musical sounds can be synthesized while maintaining coverage of the wide variety of the timbres.

When high-quality musical sounds are synthesized by the composite electronic musical instrument, timbres may be safely changed within the limited variety of the timbres in accordance with internal setting by a player. However, in case of producing a musical sound based on externally provided timbre code data which is prepared in accordance with the aforesaid timbre table, a timbre of the sound source of the waveform memory type is automatically selected in spite of the high-quality sound source of the physical model type being provided. Namely, the musical sound is synthesized and produced by the selected waveform memory type sound source with low-quality. A conceivable method for avoiding this is to share the timbre table by both of the waveform memory type sound source and the high-quality physical model type sound source. However, a ready-made waveform memory is difficult to rewrite waveforms. It is wasteful to abandon the ready-made waveform memory. Furthermore, a complex table configuration must be formed if the same is shared commonly by the different types of the sound sources. Also, as described later, in simulating the same musical instrument, the conventional waveform memory type sound source may have a better performance for certain usage than the physical model type sound source. Thus, it is preferable that a timbre table should be prepared for each of the musical sound synthesizing systems.

SUMMARY OF THE INVENTION

Thus, it is an object of the present invention to provide an electronic musical instrument operative when a timbre of an inferior sound producing system is designated for synthesizing and producing a musical sound in the same timbre by a superior sound producing system as much as possible.

According to the present invention, an electronic musical instrument comprises a composite sound source for generating a musical tone, and including a first synthesizing circuit for creating a variety of timbres of the musical tone having a superior quality and a second synthesizing circuit for creating another variety of timbres of the musical tone having an inferior quality, admission means for admitting designation information effective to designate one of the first and second synthesizing circuits to be activated and effective to designate a timbre to be created by the designated one of the first and second synthesizing circuits, detection means operative when the second synthesizing circuit is designated for providing a detection signal if the designated timbre can be also created by the first synthesizing circuit, and control means responsive to the detection signal for altering the admitted designation information so that the first synthesizing circuit is activated in place of the second synthesizing circuit so as to create the designated timbre by the superior quality.

In a more general aspect of the invention, an electronic musical instrument comprises a plurality of synthesizing circuits each of which has a different tone generation mechanism for generating a musical tone and each of which creates a variety of timbres for the musical tone, admission means for admitting designation information effective to designate one of the synthesizing circuits to be activated and effective to designate a timbre to be created by the designated synthesizing circuit, detection means for checking if the designated timbre can be created by a non-designated synthesizing circuit, and control means operative according to check results of the detection means for altering the admitted designation information if desired to activate the non-designated synthesizing circuit in place of the designated synthesizing circuit to create the designated timbre.

In a specific aspect of the invention, an electronic musical instrument comprises a plurality of synthesizing circuits each of which has a different tone generation mechanism for generating a musical tone and each of which creates a variety of timbres for the musical tone, admission means for admitting designation information effective to designate one of the synthesizing circuits to be activated and effective to designate a timbre to be created by the designated synthesizing circuit, first detection means for checking if the designated timbre is available by a non-designated synthesizing circuit, second detection means for checking if the designated timbre is allowed for substitute creation by the non-designated synthesizing circuit, and control means operative according to check results of the first and second detection means for processing the admitted designation information to assign the designated timbre to a suitable one of the designated and non-designated synthesizing circuits.

According to the invention, when a specific timbre is designated by the admitted designation information and when a musical sound can also be produced by a tone generator of the superior sound producing system, the designation information is suitably rewritten so as to activate the superior sound producing system even if the inferior sound producing system is designated, whereby a sound in a higher-quality can be produced by the specific timbre. Also, even if a sound can be produced by the superior or high-quality sound producing system, the replacement or substitution can be inhibited in view of restrictions on the number of simultaneously created timbres by the superior system or the like, whereby optimum replacement of the systems is enabled without imposing a burden on design of the sound source.

BRIEF DESCRIPTION OF THE DRAWINGS

FIG. 2 is a table diagram illustrating replacement scheme of timbres in the electronic musical instrument of the invention.

DETAILED DESCRIPTION OF THE INVENTION

Figure 1:
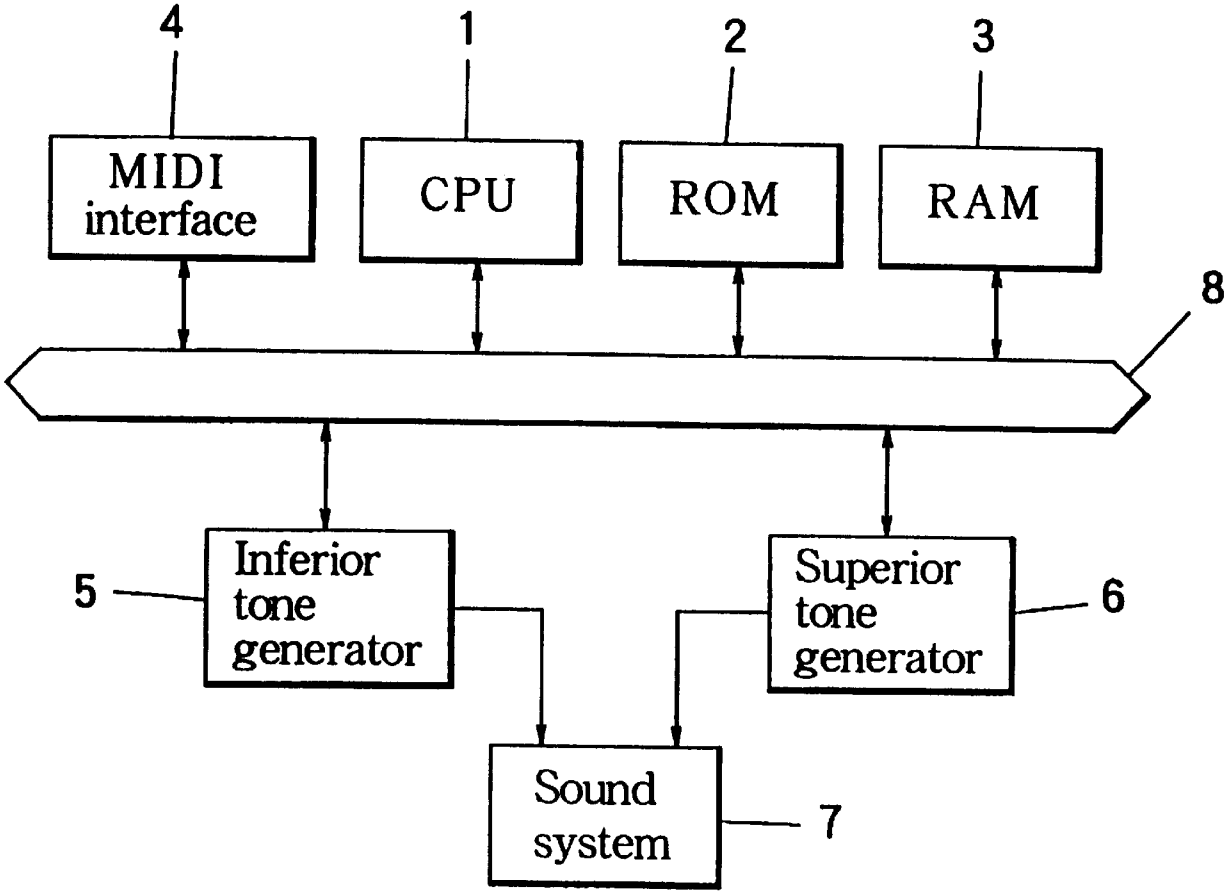
FIG. 1 is a schematic block diagram of an electronic musical instrument according to the invention.

FIG. 1 is a block diagram of an electronic musical instrument according to an embodiment of the present invention. In FIG. 1, reference numeral 1 denotes a microcomputer (CPU) which exercises various kinds of control over the electronic musical instrument by executing programs stored in a ROM 2. The ROM (Read Only Memory) 2 stores programs to be executed by the CPU 1 and preset voice data to be reproduced. A RAM (Random Access Memory) 3 is used as a working area or the like for the CPU 1 to execute the programs. A MIDI interface 4 is provided for sending a MIDI message created within the electronic musical instrument to the outside and for receiving a MIDI message from the outside. A tone generator 5 is composed of a waveform memory type synthesizing circuit having a waveform memory in which plural musical sound waveforms are stored to create a wide variety of timbres. Another tone generator 6 of the physical model system is constructed to stimulate physical behavior of a natural musical instrument to synthesize a musical sound. A sound system 7 sets a mixing ratio and a total volume for each channel with respect to musical sound signals synthesized by and inputted from the tone generators 5 and 6. Further, the sound system 7 converts the digital musical sound signal to an analog signal to produce a sound. A data/address bus 8 interconnects the aforesaid various components.

In operation of the electronic musical instrument thus arranged, a timbre of a regular or standard sound source or a timbre of an expansion sound source is designated by designation information admitted from the outside via the MIDI interface 4. The operation will now be concisely described with reference to FIG. 2. The standard source corresponds to the inferior tone generator 5 of the waveform memory type which generates musical tones of inferior quality. The expansion sound source corresponds to the superior tone generator 6 of the physical model type which generates musical tones of superior quality.

First, when a timbre of the standard sound source is designated by the admitted designation information, it is detected whether the designated timbre is available by the expansion sound source. A process to be performed is different between a case where the designated timbre is available by the expansion sound source and another case where the designated timbre is not available by the expansion sound source.

When the designated timbre is available by the expansion sound source, it is checked whether the designated timbre is replaceable or changeable from the standard sound source to the expansion sound source. If changeable, the expansion sound source performs substitutional sound production. If not changeable, the standard sound source performs a normal sound production. Also, if the designated timbre is not available by the expansion sound source, the standard sound source performs a normal sound production. Whether the timbre is changeable or not depends on the types of the sound sources and kinds of the timbre. This will be described later.

Furthermore, when a time of the expansion sound source is designated, it is checked whether the designated timbre is available by the expansion sound source or not. A process to be performed is different between a case where the designated timbre is available by the expansion sound source and another case where the designated timbre is not available. When the designated timbre is available by the expansion sound source, the expansion sound source performs a normal sound production. On the other hand, when the designated timbre is not available by the expansion sound source, it is checked whether the designated timbre is available or not by the standard sound source. If the designated timbre is available by the standard sound source, the standard sound source performs a substituted sound production in place of the expansion sound source. If the designated timbre is not available by the standard sound source, the designation information is simply ignored, and a change of timbre is not effected.

As is described above, in the electronic musical instrument of the present invention, even when a timbre of the inferior standard sound source is designated, if the designated timbre is available by the superior expansion sound source, the expansion sound source is activated as much as possible in place of the standard sound source, whereby a high-quality musical sound is synthesized by the designated timbre. On the other hand, when a timbre by the expansion sound source is designated and when the designated timbre is not available by the expansion sound source, the expansion sound source is replaced by the standard sound source as much as possible, whereby a musical sound is successfully synthesized in the designated timbre.

Figure 3:
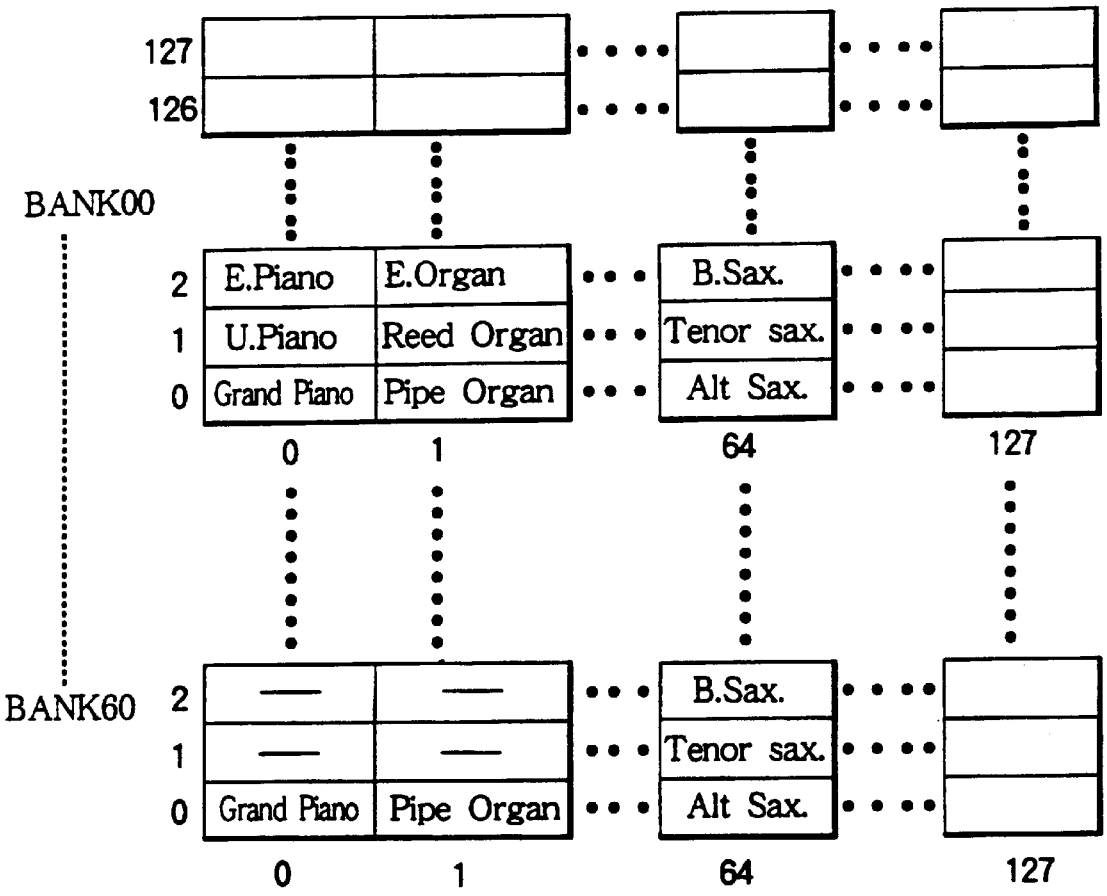
FIG. 3 is an example of a timbre table provided in the electronic musical instrument of the invention.

Next, FIG. 3 shows an example of a timbre table installed in the electronic musical instrument of the present invention. As shown in FIG. 3, the timbre table is two-dimensionally arranged such that kinds of instruments are assigned to a horizontal axis thereof, and timbre variations of the same instrument kind are assigned to a vertical axis thereof. Column addresses ranging from 0 to 127 are assigned to the horizontal axis of the timbre table, whereby a user can register up to 128 kinds of the instruments such as Grand Piano, Pipe Organ, Alt Sax., and so on. A BANK00 group of the timbre table is provided to register therein various kinds of instruments available by the tone generator 5 of the waveform memory type. The BANK00 group can register up to 128 timbre variations for each kind. For example, piano kind includes timbre variations such as Grand Piano, Upright Piano, Electric Piano, and so on. Furthermore, a BANK60 group is provided to register therein various kinds of instruments such as Grand Piano available by the tone generator 6 of the physical model type. The BANK60 registers plural timbre variations for each kind. Some of the instrument kinds such as Grand Piano and Pipe Organ do not contain timbre variations. The reason why BANK60 does not contain timbre variations for these kinds is that, as described before, the tone generator of the physical model type requires programming according to a mode of generating a musical sound, and is not suitable for preparing a wide range of timbre variations.

In order to designate a desired timbre in this timbre table, one of BANK00, . . . , BANK60 is selected by MSB of the first byte of 2-byte bank select data. However, in the construction shown in FIG. 1, only two BANKs, namely BANK00 and BANK60, are prepared because the number of the tone generator is two. Further, one of instrument kinds arranged in columns of the selected BANK is designated by LSB of the second byte. Moreover, a timbre variation which corresponds to one row address is selected by 1-byte program change data. Consequently, the desired timbre is designated and the attending tone generator is designated by designation information composed of the bank select data and the program change data. In other words, the timbre table shown in FIG. 3 has a three-dimensional arrangement of timbres in terms of the bank groups, instrument kinds and variations.

Figure 4:
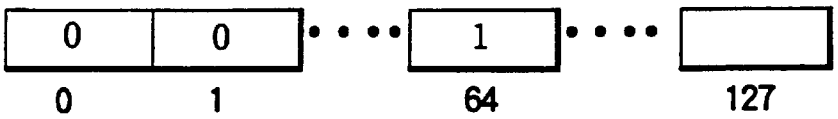
FIG. 4 is an example of a changeability flag used in the electronic musical instrument of the invention.

FIG. 4 shows a changeability flag. When replacement of the sound sources in inhibited for some instrument kinds, the changeability flag is set to "0". When replacement of sound sources is allowed, the changeability flag is set to "1". The changeability flag may be set for each instrument kind, and hence up to 128 flags corresponding to the respective timbre kinds are set. As shown in FIG. 4, flags for the grand piano kind and pipe organ kind are set to "0". The reason for this is as follows. The piano and organ usually need to simultaneously produce many tones during a musical performance. In this connection, if the number of simultaneously produced tones is increased in the tone generator 6 of the physical model type, the practical operation speed of computation means such as CPU, DSP and the like becomes insufficient to synthesize the tones. To remedy this, the quantity of hardware must be increased extremely. Thus, in spite of capability of synthesizing high-quality musical sounds, the number of simultaneously produced tones is limited in view of cost performance. Accordingly, the changeability flag is set to "0" for the timbre variations of the piano and organ kinds. On the other hand, the changeability flag is set to "1", which indicates replacement of sound sources, for the timbre variations of the saxophone kind because the saxophone is an instrument which does not need to simultaneously produce many musical tones during a musical performance, and because the tone generator 6 of the physical model type is suitable for synthesizing musical sounds of a wind instrument.

In the electronic musical instrument of the present invention having the aforesaid timbre table and the changeability flag, when the timbre of the grand piano by the standard or normal sound source (the tone generator 5 of the waveform memory type) is designated by the designation information, the normal sound source produces a musical sound even though the designated timbre can be created by the expansion sound source (the tone generator 6 of the physical model type) because the changeability flag is set to "0" for the grand piano kind. As a result, a practical number of simultaneously produced tones can be secured, whereby a musical performance is free from any hindrance. On the other hand, when the timbre of the alt sax by the normal sound source is designated, the expansion sound source performs substitute sound production in place of the normal sound source because the timbre is available by the expansion sound source and because the changeability flag is set to "1". Thus, a high-quality musical sound can be produced by the designated timbre.

Figure 5:
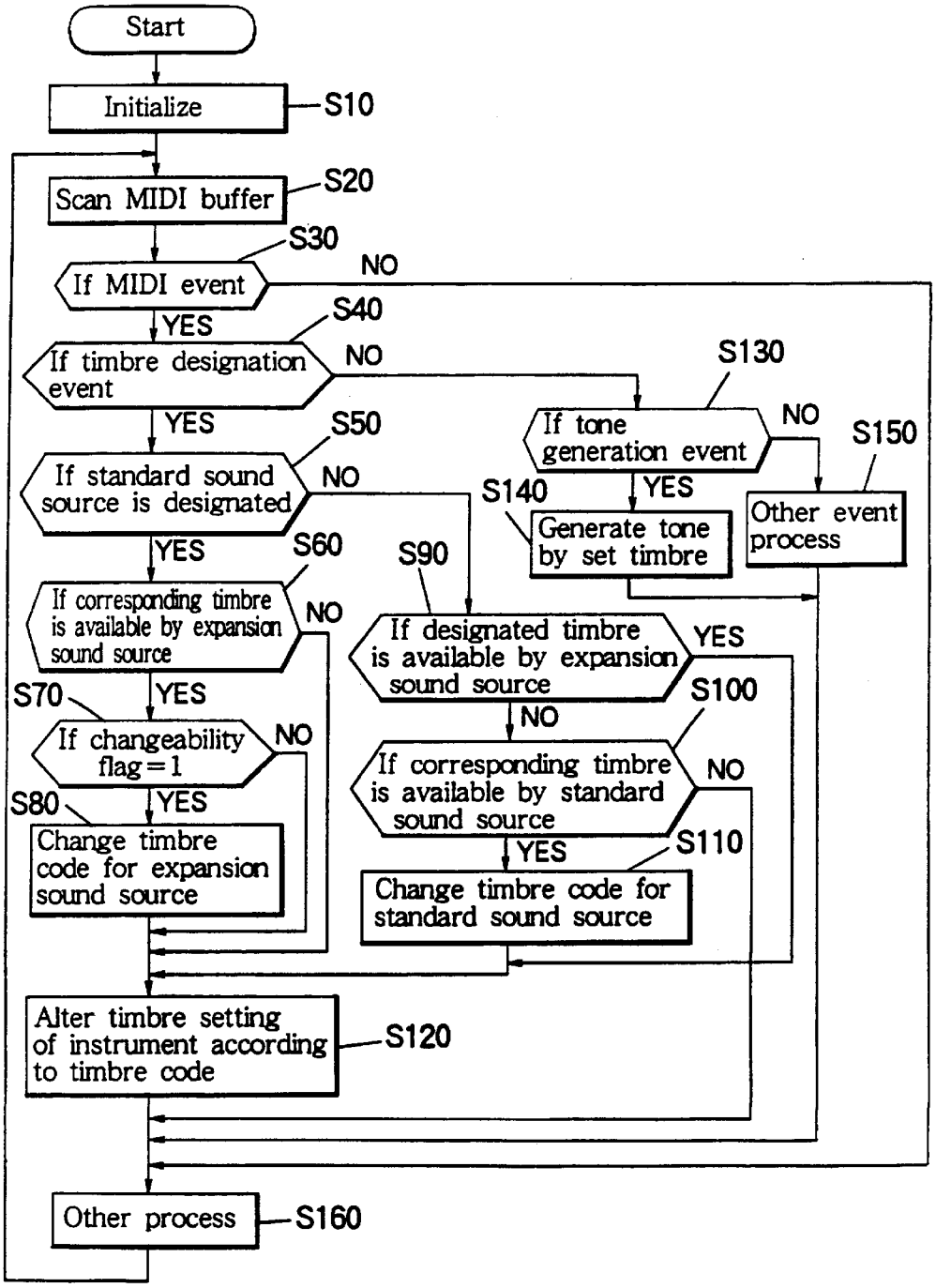
FIG. 5 is a main flow chart showing operation of the electronic musical instrument of the present invention.

The operation of the thus constructed electronic musical instrument of the present invention will now be described in detail with reference to a main flow chart shown in FIG. 5. In this main flow chart, when a power supply to the electronic musical instrument is turned on to start operation, various registers and the like are initialized at step S10. At step S20, MIDI data is scanned in a buffer of the MIDI interface. At step S30, whether a MIDI event is present or not is detected. When the absence of a MIDI event is detected, processing proceeds to step S160 to carry out other processes of the electronic musical instrument. When the presence of a MIDI event is detected at step S30, whether the MIDI event is a timbre designation event or not is determined at step S40. When it is determined that the MIDI event is the timbre designation event, whether the standard sound source is designated or not is further determined at step S50.

On the other hand, when it is determined at step S40 that the MIDI event is not the timbre designation event, whether the MIDI event is a tone generation event of not is determined at step S130. When it is determined that the MIDI event is the tone generation or sound producing event, a sound producing process is carried out at step S140 for generating a musical tone in a set timbre by a working sound source. Then, the processing proceeds to step S160. When it is determined that the event is not the sound producing event, the MIDI event should be another event, and thus another event process is executed at step S150. Then, the processing proceeds to step S160.

When it is determined at step S50 that the standard sound source is designated, whether a corresponding timbre is available or not by the expansion sound source is determined at step S60. When it is determined that the corresponding timbre is available by the expansion sound source, whether the changeability flag is set to "1" or not is detected at step S70. When the changeability flag="1" is detected, a timbre code of the designated timbre is changed to that of the corresponding timbre for the expansion sound source at step S80. Next, timbre setting of the instrument is changed in accordance with the timbre code specified at step S120. Thus, preparations are completed for producing a musical sound in the corresponding timbre of the expansion sound source in place of the standard source.

When it is determined at step S50 that the standard sound source is not designated but the expansion sound source is designated, whether the designated timbre is available or not by the expansion sound source is determined at step S90. When it is determined that the designated timbre is available, the processing proceeds to step S120 to change the timbre setting of the instrument equipment in accordance with the designated timbre code. Thus, preparation is completed for producing a sound in the designated timbre by the expansion sound source.

When it is determined that the designated timbre is not available by the expansion sound source, whether a timbre corresponding to the designated timbre is available by the standard sound source is determined at step S100. When it is determined that the corresponding timbre is available, a timbre code of the designated timbre is changed to that of the corresponding timbre for the standard sound source at step S110. Next, the timbre setting state of the instrument is changed in accordance with the timbre code at step S120. Thus, preparation is completed for producing a sound in the corresponding timbre by the standard sound source in place of the expansion sound source.

On the other hand, when it is determined at step S100 that a timbre corresponding to the designated timbre is not available by the standard sound source, the processing directly proceeds to step S160 to jump the step S120 to thereby ignore the admitted designation information.

Furthermore, when it is determined at step S60 that a corresponding timbre is not available or when it is detected at step S70 that the changeability flag is not set with "1", the old timbre setting of the instrument is changed in accordance with the designated timbre at step S120. Thus, preparation is completed for producing a sound in the designated timbre by the designated standard sound source as usual.

On completion of the preparation process at step S120, the processing proceeds to step S160 to carry out other processes of the electronic musical instrument. On completion of the process at step S160, the processing returns to step S20. Thus, the process through step S20 to S160 is regularly executed in a cyclic manner.

Since the electronic musical instrument operates in accordance with the main flow chart as described above, the replacement of the tone generators and the substitution of the timbre as shown in FIG. 2 will be understood. The changeability flag is set as shown in FIG. 4. Alternatively, the flag may be set in accordance with timbres by a maker or may be adapted to allow setting by the user. When the user is to set the changeability flag, the setting operation may be done at step S160 of the "other process" in the main routine. The order of the various determination steps in the main routine is not limited to the aforesaid sequence, but may be freely modified.

The changeability flag is not necessarily set for each kind of instrument, but may be set for each timbre. When a corresponding timbre is available by the expansion sound source, replacement of the sound source may be unconditionally effected without determining the changeability. Furthermore, the standard sound source is not limited to the tone generator of the waveform memory type, but may be a tone generator of the FM synthesis type or the like. Also, the expansion sound source is not limited to the tone generator of the physical model type, but may be some other sound source capable of synthesizing a high-quality musical sound. In addition, the present invention is widely applicable to electronic musical instruments employing a combination of sound source systems which are different in synthesis conditions such as the quantity of computation, the quality of musical sounds, the number of simultaneously produced tones and the like.

Since the present invention is constructed as described above, when a timbre is designated by the timbre designation information and also when the designated timbre can be created by a tone generator of the high-quality sound producing type, the timbre designation information is altered or rewritten, whereby a higher-quality timbre can be created for producing a musical sound. Also, even when a sound can be produced by the tone generator of the high-quality sound producing type, replacement of the tone generator can be inhibited in view of practical restrictions on the number of simultaneously produced tones and the like, whereby optimum replacement of the tone generator is enabled without imposing a burden on the design of the instrument.

What is claimed is:

1. An electronic musical instrument comprising:

a composite sound source for generating a musical tone, and including a first synthesizing circuit for creating a variety of timbres of the musical tone having a superior quality and a second synthesizing circuit for creating another variety of timbres of the musical tone having an inferior quality;

admission means for admitting designation information effective to designate one of the first and second synthesizing circuits to be activated and effective to designate a timbre to be created by the designated one of the first and second synthesizing circuits;

detection means operative when the second synthesizing circuit is designated for providing a detection signal if the designated timbre can be also created by the first synthesizing circuit; and control means responsive to the detection signal for altering the admitted designation information so that the first synthesizing circuit is activated in place of the second synthesizing circuit so as to create the designated timbre by the superior quality.

2. An electronic musical instrument according to claim 1; further comprising inhibition means for inhibiting the control means from altering the admitted designation information if the designated timbre is not allowed for substitutional creation by the first synthesizing circuit.

3. An electronic musical instrument according to claim 1; wherein the detection means includes means operative when the first synthesizing circuit is designated for providing another detection signal if the designated timbre is not available by the first synthesizing circuit but available by the second synthesizing circuit so that the control means responds to said another detection signal to activate the second synthesizing circuit in place of the first synthesizing circuit.

4. An electronic musical instrument according to claim 1; wherein the detection means includes means operative when the first synthesizing circuit is designated for providing another detection signal if the designated timbre is not available by either of the first and second synthesizing circuits so that the control means responds to said another detection signal to simply ignore the admitted designation information.

5. An electronic musical instrument according to claim 1; wherein the second synthesizing circuit comprises a regular tone generator for creating a great variety of timbres having an inferior quality, while the first synthesizing circuit comprises an expansion tone generator for creating a small variety of timbres having a superior quality.

6. An electronic musical instrument comprising:

a plurality of synthesizing circuits each of which has a different tone generation mechanism for generating a musical tone and each of which creates a variety of timbres for the musical tone;

admission means for admitting designation information effective to designate one of the synthesizing circuits to be activated and effective to designate a timbre to be created by the designated synthesizing circuit;

detection means for checking if the designated timbre can be created by a non-designated synthesizing circuit; and control means operative according to check results of the detection means for altering the admitted designation information if desired to activate the non-designated synthesizing circuit in place of the designated synthesizing circuit to create the designated timbre.

7. An electronic musical instrument comprising:

a plurality of synthesizing circuits each of which has a different tone generation mechanism for generating a musical tone and each of which creates a variety of timbres for the musical tone;

admission means for admitting designation information effective to designate one of the synthesizing circuits to be activated and effective to designate a timbre to be created by the designated synthesizing circuits;

first detection means for checking if the designated timbre is available by a non-designated synthesizing circuit;

second detection means for checking if the designated timbre is allowed for substitute creation by the non-designated synthesizing circuit; and control means operative according to check results of the first and second detection means for processing the admitted designation information to assign the designated timbre to a suitable one of the designated and non-designated synthesizing circuits.

*8. An electronic musical apparatus comprising:*

*a sound source capable of creating a plurality of timbres and is capable of generating a musical tone having one of the timbres;*

*an interface that receives designation information effective to designate a timbre to cause the sound source to generate the musical tone of the designated timbre;*

*a detector that detects whether the sound source can create a substitute timbre which can be adopted in place of the designated timbre; and*

*a controller operative when the detector detects that the sound source can create the substitute timbre to control the sound source to generate the musical tone of the substitute timbre even if the sound source can create the designated timbre.*

*9. An electronic musical apparatus according to claim 8, wherein the detector detects whether the sound source can create the timbre designated by the designation information, and wherein the controller operates, when the detector detects that the sound source cannot create the designated timbre, to control the sound source to generate the musical tone of another timbre in place of the designated timbre.*

*10. An electronic musical apparatus according to claim 8, wherein the detector detects whether the sound source can create the timbre designated by the designation information, and wherein the controller operates, when the detector detects that the sound source is unable to create the designated timbre, to control the sound source to ignore the designation information received by the interface.*

*11. An electronic musical apparatus according to claim 8, wherein the detector detects that the sound source can create a substitute timbre having a superior quality in place of the designated timbre having an inferior quality so that the controller compels the sound source to switch from the designated timbre to the substitute timbre in spite of the designation information received by the interface.*

*12. An electronic musical system comprising:*

*a sound source that is capable of creating a plurality of timbres and is capable of generating a musical tone having one of the timbres;*

*an admission unit that admits designation information effective to designate a timbre for causing the sound source to generate the musical tone of the designated timbre;*

*a first detection unit that detects whether a substitute timbre is available in the sound source to replace the designated timbre;*

*a second detection unit that detects whether the sound source is allowed to replace the designated timbre by the substitute timbre; and*

*a control unit operative when the first detection unit detects that the substitute timbre is available and when the second detection unit detects that the sound source is allowed to replace the designated timbre by the substitute timbre for controlling the sound source to generate the musical tone of the substitute timbre even if the sound source can create the designated timbre.*

*13. An electronic musical system according to claim 12; further comprising a third detection unit that detects whether the sound source can create the timbre designated by the designation information, and wherein the control unit operates when the third detection unit detects that the sound source cannot create the designated timbre for controlling the sound source to generate the musical tone of another timbre in place of the designated timbre.*

*14. An electronic musical system according to claim 12; further comprising a third detection unit that detects whether the sound source can create the timbre designated by the designation information, and wherein the control unit operates when the third detection unit detects that the sound source is unable to create the designated timbre for controlling the sound source to ignore the designation information admitted by the admission unit.*

*15. An electronic musical system according to claim 12; wherein the first detection unit detects that the sound source can create a substitute timbre having a superior quality in place of the designated timbre having an inferior quality so that the control unit compels the sound source to switch from the designated timbre to the substitute timbre in spite of the designation information admitted by the admission unit.*

*16. An electronic musical apparatus comprising:*

*a composite sound source that generates a musical tone, and that includes a first synthesizing circuit for creating a variety of timbres of the musical tone having a superior quality and a second synthesizing circuit for*

*creating another variety of timbres of the musical tone having an inferior quality;*

*an interface that receives designation information effective to designate one of the first and second synthesizing circuits to be activated and effective to designate a timbre to be created by the designated one of the first and second synthesizing circuits;*

*a detector operative when the second synthesizing circuit is designated to provide a detection signal if the designated timbre can be also created by the first synthesizing circuit; and*

*a controller responsive to the detection signal which alters the received designation information so that the first synthesizing circuit is activated in place of the second synthesizing circuit so as to create the designated timbre by the superior quality.*

*17. An electronic musical apparatus according to claim 16, further comprising an inhibitor adapted to inhibit the controller from altering the received designation information if the designated timbre is not allowed for substitutional creation by the first synthesizing circuit.*

*18. An electronic musical apparatus according to claim 16, wherein the detector includes a portion operative when the first synthesizing circuit is designated to provide another detection signal if the designated timbre is not available by the first synthesizing circuit but available by the second synthesizing circuit so that the controller responds to said another detection signal to activate the second synthesizing circuit in place of the first synthesizing circuit.*

*19. An electronic musical apparatus according to claim 16, wherein the detector includes a portion operative when the first synthesizing circuit is designated to provide another detection signal if the designated timbre is not available by either of the first and second synthesizing circuits so that the controller responds to said another detection signal to simply ignore the received designation information.*

*20. An electronic musical apparatus according to claim 16, wherein the second synthesizing circuit comprises a regular tone generator for creating a great variety of timbres having an inferior quality, while the first synthesizing circuit comprises an expansion tone generator for creating a small variety of timbres having a superior quality.*

*21. An electronic musical apparatus comprising:*

*a plurality of synthesizing circuits each of which has a different tone generation mechanism for generating a musical tone and each of which creates a variety of timbres for the musical tone;*

*an interface which receives designation information effective to designate one of the synthesizing circuits to be activated and effective to designate a timbre to be created by the designated synthesizing circuit;*

*a detector that checks if the designated timbre can be created by a non-designated synthesizing circuit; and*

*a controller operative according to check results of the detector to alter the received designation information and, if desired, to activate the non-designated synthesizing circuit in place of the designated synthesizing circuit to create the designated timbre.*

*22. An electronic musical apparatus comprising:*

*a plurality of synthesizing circuits each of which has a different tone generation mechanism for generating a musical tone and each of which creates a variety of timbres for the musical tone;*

*an interface which receives designation information effective to designate one of the synthesizing circuits to be activated and effective to designate a timbre to be created by the designated synthesizing circuit;*

*a first detector that checks if the designated timbre is available by a non-designated synthesizing circuit;*

*a second detector that checks if the designated timbre is allowed for substitute creation by the non-designated synthesizing circuit; and*

*a controller operative according to check results of the first and second detectors to process the received designation information and to assign the designated timbre to a suitable one of the designated and non-designated synthesizing circuits.*

*23. A method of operating an electronic musical apparatus having a sound source capable of creating a plurality of timbres and capable of generating a musical tone having one of the timbres, the method comprising the steps of:*

*admitting designation information effective to designate a timbre for causing the sound source to generate the musical tone of the designated timbre;*

*detecting whether the sound source an create a substitute timbre which can be adopted in place of the designated timbre; and*

*controlling the sound source to generate the musical tone of the substitute timbre when the detecting step detects that the sound source can create the substitute timbre even if the sound source can create the designated timbre.*

*24. A method of operating an electronic musical system having a sound source capable of creating a plurality of timbres and capable of generating a musical tone having one of the timbres, the method comprising the steps of:*

*admitting designation information effective to designate a timbre for causing the sound source to generate the musical tone of the designated timbre;*

*first detecting whether a substitute timbre is available in the sound source to replace the designated timbre;*

*second detecting whether the sound source is allowed to replace the designated timbre by the substitute timbre; and*

*controlling the sound source when the first detecting step detects that the substitute timbre is available and when the second detecting step detects that the sound source is allowed to replace the designated timbre by the substitute timbre so as to force the sound source to generate the musical tone of the substitute timbre even if the sound source can create the designated timbre.*

*25. A method of operating an electronic musical apparatus having a composite sound source that generates a musical tone, and that includes a first synthesizing circuit for creating a variety of timbres of the musical tone having a superior quality and a second synthesizing circuit for creating another variety of timbres of the musical tone having an inferior quality, the method comprising the steps of:*

*admitting designation information effective to designate one of the first and second synthesizing circuits to be activated and effective to designate a timbre to be created by the designated one of the first and second synthesizing circuits;*

*detecting when the second synthesizing circuit is designated to provide a detection signal if the designated timbre can be also created by the first synthesizing circuit; and*

*responding to the detection signal to alter the admitted designation information so that the first synthesizing circuit is activated in place of the second synthesizing circuit so as to create the designated timbre by the superior quality.*

*26. A method of operating an electronic musical apparatus having a plurality of synthesizing circuits each of which has a different tone generation mechanism for generating a musical tone and each of which creates a variety of timbres for the musical tone, the method comprising the steps of:*

*admitting designation information effective to designate one of the synthesizing circuits to be activated and effective to designate a timbre to be created by the designated synthesizing circuit;*

*checking if the designated timbre can be created by a non-designated synthesizing circuit; and*

*altering the admitted designation information according to check results of the checking step if desired to activate the non-designated synthesizing circuit in place of the designated synthesizing circuit to create the designated timbre.*

*27. A method of operating an, electronic musical apparatus having a plurality of synthesizing circuits each of which has a different tone generation mechanism for generating a musical tone and each of which creates a variety of timbres for the musical tone, the method comprising the steps of:*

*admitting designation information effective to designate one of the synthesizing circuits to be activated and effective to designate a timbre to be created by the designated synthesizing circuit;*

*first checking if the designated timbre is available by a non-designated synthesizing circuit;*

*second checking if the designated timbre is allowed for substitute creation by the non-designated synthesizing circuit; and*

*processing the admitted designation information according to check results of the first and second checking steps so as to assign the designated timbre to a suitable one of the designated and non-designated synthesizing circuits.*

*28. A memory medium for use in an electronic musical apparatus having a CPU and a sound source capable of creating a plurality of timbres and capable of generating a musical tone having one of the timbres, the memory medium containing program instructions executable by the CPU for causing the electronic musical apparatus to perform the method comprising the steps of:*

*admitting designation information effective to designate a timbre for causing the sound source to generate the musical tone of the designated timbre;*

*detecting whether the sound source can create a substitute timbre which can be adopted in place of the designated timbre; and*

*controlling the sound source to generate the musical tone of the substitute timbre when the detecting step detects that the sound source can create the substitute timbre even if the sound source can create the designated timbre.*

*29. A memory medium for use in an electronic musical system having a CPU and a sound source capable of creating a plurality of timbres and capable of generating a musical tone having one of the timbres, the memory medium containing program instructions executable by the CPU for causing the electronic musical system to perform the method comprising the steps of:*

*admitting designation information effective to designate a timbre for causing the sound source to generate the musical tone of the designated timbre;*

*first detecting whether a substitute timbre is available in the sound source to replace the designated timbre;*

*second detecting whether the sound source is allowed to replace the designated timbre by the substitute timbre; and*

*controlling the sound source when the first detecting step detects that the substitute timbre is available and when the second detecting step detects that the sound source is allowed to replace the designated timbre by the substitute timbre so as to force the sound source to generate the musical tone of the substitute timbre even if the sound source can create the designated timbre.*

*30. A memory medium for use in an electronic musical apparatus having a CPU and a composite sound source that generates a musical tone and that includes a first synthesizing circuit for creating a variety of timbres of the musical tone having a superior quality and a second synthesizing circuit for creating another variety of timbres of the musical tone having an inferior quality, the memory medium containing program instructions executable by the CPU for causing the electronic musical apparatus to perform the method comprising the steps of:*

*admitting designation information effective to designate one of the first and second synthesizing circuits to be activated and effective to designate a timbre to be created by the designated one of the first and second synthesizing circuits;*

*detecting when the second synthesizing circuit is designated to provide a detection signal if the designated timbre can be also created by the first synthesizing circuit; and*

*responding to the detection signal to alter the admitted designation information so that the first synthesizing circuit is activated in place of the second synthesizing circuit so as to create the designated timbre by the superior quality.*

*31. A memory medium for use in an electronic musical apparatus having a CPU and a plurality of synthesizing circuits each of which has a different tone generation mechanism for generating a musical tone and each of which creates a variety of timbres for the musical tone, the memory medium containing program instructions executable by the CPU for causing the electronic musical apparatus to perform the method comprising the steps of:*

*admitting designation information effective to designate one of the synthesizing circuits to be activated and effective to designate a timbre to be created by the designated synthesizing circuit;*

*checking if the designated timbre can be created by a non-designated synthesizing circuit; and*

*altering the admitted designation information according to check results of the checking step if desired to activate the non-designated synthesizing circuit in place of the designated synthesizing circuit to create the designated timber.*

*32. A memory medium for use in an electronic musical apparatus having a CPU and a plurality of synthesizing circuits each of which has a different tone generation mechanism for generating a musical tone and each of which creates a variety of timbres for the musical tone, the memory medium containing program instructions executable by the CPU for causing the electronic musical apparatus to perform the method comprising the steps of:*

*admitting designation information effective to designate one of the synthesizing circuits to be activated and effective to designate a timbre to be created by the designated synthesizing circuit;*

*first checking if the designated timbre is available by a non-designated synthesizing circuit;*

*second checking if the designated timbre is allowed for substitute creation by the non-designated synthesizing circuit; and*

*processing the admitted designation information according to check results of the first and second checking steps so as to assign the designated timbre to a suitable one of the designated and non-designated synthesizing circuits.*

* * * * *